United States Patent [19]

Nisley et al.

[11] Patent Number: 4,973,172
[45] Date of Patent: Nov. 27, 1990

[54] COATED PRODUCTS FOR USE IN HARSH ENVIRONS

[75] Inventors: Donald L. Nisley, Greenville, S.C.; Randall H. Alvis, Rogersville, Tenn.

[73] Assignee: Reliance Electric Industrial Company, Greenville, S.C.

[21] Appl. No.: 501,745

[22] Filed: Mar. 29, 1990

[51] Int. Cl.⁵ .............................................. F16C 25/08
[52] U.S. Cl. ..................................... 384/492; 384/498; 384/624; 384/625
[58] Field of Search ............... 384/492, 477, 300, 625, 384/908, 909, 213, 145, 146, 624

[56] References Cited

U.S. PATENT DOCUMENTS

| | | | |
|---|---|---|---|
| 2,004,708 | 6/1935 | Pfanstiehl | 384/625 |
| 3,957,319 | 5/1976 | Gorski | 384/568 |
| 4,252,859 | 2/1981 | Concannon et al. | 428/422 |
| 4,554,704 | 11/1985 | Raffaeli | 384/300 |
| 4,834,400 | 5/1989 | Lebeck | 384/625 |

OTHER PUBLICATIONS

Teflon Industrial Coatings-Du Pont (no date).
Teflon/Silverstone Coatings Fact Sheet-Du Pont (no date).

*Primary Examiner*—Lenard A. Footland
*Attorney, Agent, or Firm*—Dority & Manning

[57] ABSTRACT

A product for use in a power train such as a bearing assembly, a reducer, a coupling or the like and which is suitable for use in a wet or harsh chemical environment including a housing, exterior surfaces of said housing having tough, durable coatings of fluorocarbon polymers to render same resistant to corrosion or chemical attack during usage in the food and chemical industry, and the method of making the same. A first polymer is present in a thickness of from about 0.5 to about 0.8 mill and exhibits thermoset characteristics for bonding to the housing. A second polymer is applied over the first polymer on all exterior surfaces to be protected in a thickness of up to about 4.0 mils and is bondable to said first polymer coating.

8 Claims, 3 Drawing Sheets

COATED PRODUCTS FOR USE IN HARSH ENVIRONS

CROSS REFERENCE TO RELATED APPLICATION

This application is a continuation-in-part of application Ser. No. 07/452,255, filed Dec. 18, 1989, which is a continuation of application Ser. No. 07/226,143, filed July 29, 1988, now abandoned.

BACKGROUND OF THE INVENTION

This invention relates to products for use in a power train, such as a bearing assembly, in environs in which particular attention must be given to cleanliness and/or where resistance to oxidation is paramount, such as in the food or chemical industry. More specifccally, this invention relates to a bearing assembly or other products having a cast iron or other housing coated at least in part with a low friction, chemically resistant polymer coating.

In the food, chemical and environmental industries there is a great need for a bearing assembly as well as other products which resists rust, and will not chip, flake or deteriorate in severe wet operating environments or under high pressure washdowns. It is also important, in such environments, that the housings not be subject to corrosion from chemicals normally encountered during use. In the past, for example, cast iron housings of such bearing assemblies have been nickel plated to render the housing resistant to the chemical and environmental demands. In one example, where a ball bearing insert is to swivel into a spherical bore of a ball bearing housing, the housing bore dimensions are controlled to give a specified swivel torque. This procedure is used for a standard line of ball bearings.

When nickel plating is applied to such a ball bearing housing, the spherical bore must be machined oversize to allow for the plating buildup, and requires an additional set up over standard machining operations. Furthermore, due to variations in plating thickness, ball bearing inserts to be used with the plated housings must be graded by size and a trial and error assembly procedure has to be employed to achieve a desired swivel torque with the assembly.

Various and sundry products have heretofore been coated with fluorocarbon polymers such as a polytetrafluorotheylene, or products themselves have been made of such products, particularly to take advantage of low friction characteristics of the polymer. It is also believed, though not known, that bearing inserts may have been produced before and coated with fluorocarbon polymers.

Bearing assemblies and other power train products according to the present invention represent improvement over the prior art. Particularly, bearing assemblies according to the present invention are fully protected from the environment, are more uniform, and, when appropriate, operate at desired assembly torque levels. Moreover, with coated bearing assemblies according to the present invention, trial and error matching of housings and inserts is no longer necessary.

SUMMARY OF THE INVENTION

It is an object of the present invention to provide an improved bearing assembly which is coated with a fluorocarbon polymer which avoids problems previously encountered with nickel plated cast iron bearing assembly housings.

It is another object of the present invention to provide a fluorocarbon polymer coated product for use in a power train which is resistant to corrosive effects of chemicals and the like.

It is another object of the present invention to provide a food equipment bearing assembly which can be utilized at a predictable swivel torque level.

Still another object is to provide an improved coated industrial product such as a bearing assembly, a reducer, a coupling, or the like which is resistant to adverse effects when used in a wet, harsh environment.

The above objects are realized by providing a thin coating of a fluorocarbon polymer on the outer surfaces of an industrial product, exemplified by a cast iron housing of a bearing assembly, which is to be exposed to chemical action in food processing or in chemical industries, and the like. The polymer coating is preferably applied by a process which permits the thickness of the coating to be closely controlled, and with which standard ball bearing housings and inserts can be employed without special grading to different sizes and trial and error matching.

More particularly, preferably a first fluorocarbon polymer having thermoset characteristics is applied to the entire surfaces of the housing, and a second fluorocarbon polymer that has thermoplastic characteristics is applied thereover to the outer surfaces of the housing, while a dummy bearing insert is placed in the bore opening within the housing to prevent deposition of the second polymer therein. An actual bearing insert received within the bore opening will then self seat therein and will exhibit a generally uniform swivel torque thereabout.

While a preferred coated product according to the present invention is a bearing assembly, and the invention is primarily described with respect to a bearing for use in industrial environs, other industrial products for use in power trains such as speed reducers, drive coupling units and the like could also be coated as described herein and are within the purview of the present invention.

BRIEF DESCRIPTION OF THE DRAWINGS

The invention will now be described in conjunction with the attached drawings in which.

DETAILED DESCRIPTION OF THE DRAWINGS

Figure 1:
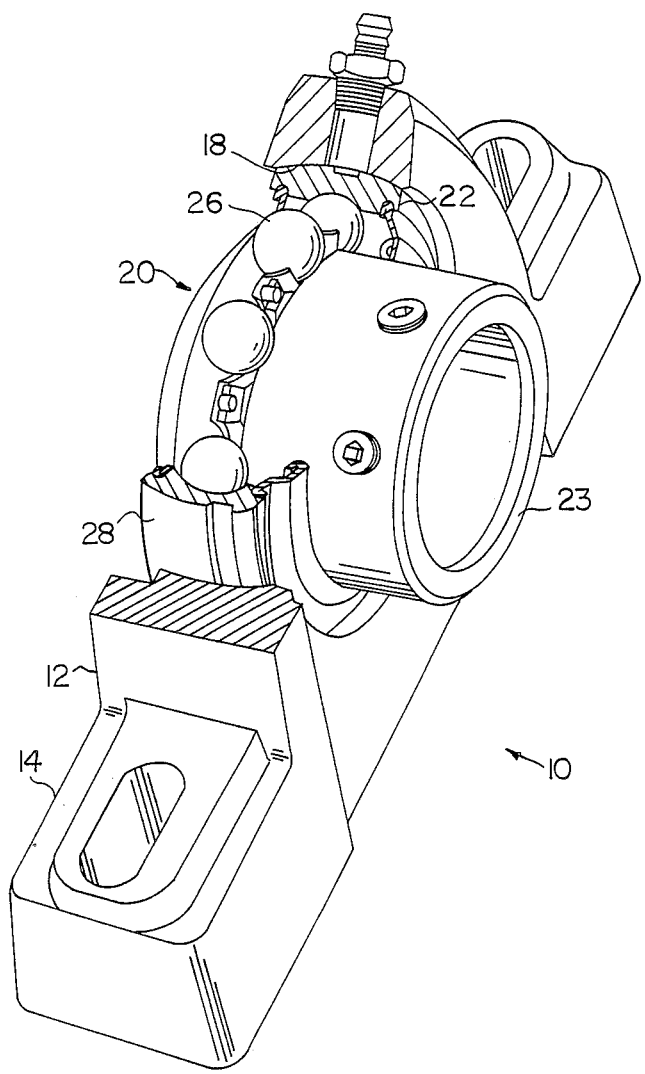
FIG. 1 is a perspective view partially in section of a bearing assembly.
Figure 2:
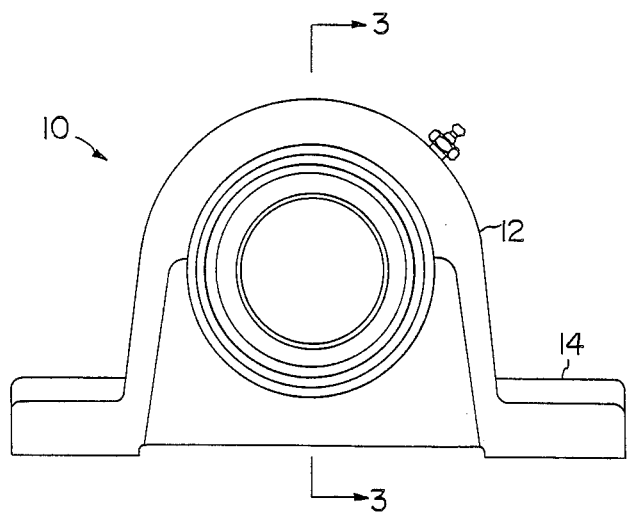
FIG. 2 is a front view of the bearing assembly with the bearing insert in the insertion position.
Figure 3:
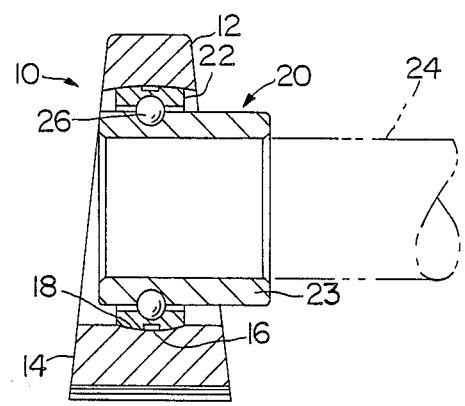
FIG. 3 is a sectional view taken along lines 3—3 of FIG. 2 with the bearing insert in the insertion position.
Figure 4:
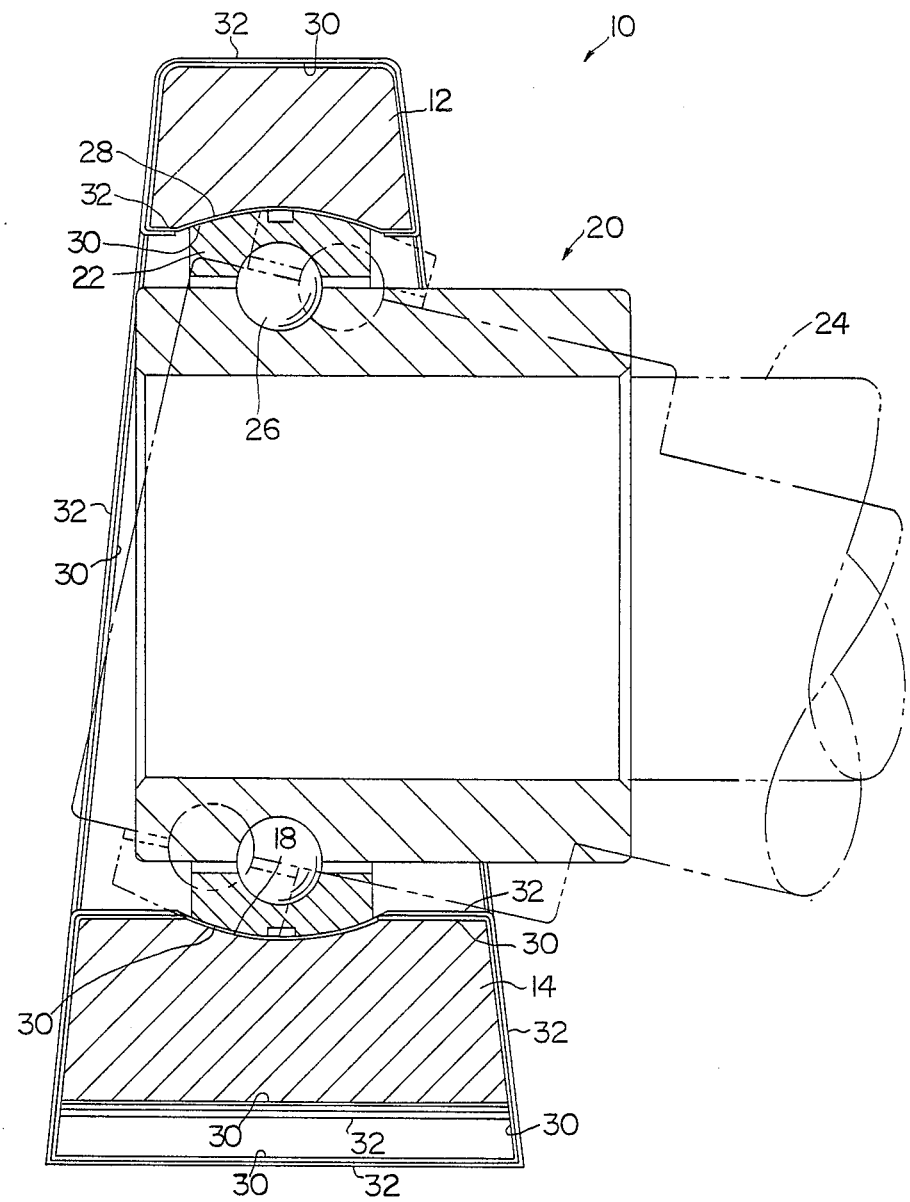
FIG. 4 is a view similar to FIG. 3, but showing displacement of the bearing insert in section to illustrate the bearing support for the shaft.

Referring now to FIGS. 1, 2 and 3, preferred embodiments of the present invention will be described, and as noted above, the description is specific to a bearing assembly though other industrial products for use in a power train could be similarly coated according to the teachings herein. Bearing assembly generally 10 includes a housing 12 which includes a base 14 having means thereon (not shown) for attachment of the assembly to a supporting surface. Housing 12 further includes a spherical bore 16 therethrough and with curved inner surfaces 18 which, in effect, are concave surfaces with respect to the outer dimensions of bore 16. A bearing insert generally 20 is provided and includes a spherical outer ring or race 22, balls, rollers or the like 26, and an inner ring or race 23. Outer ring 22 of insert 20 is receivable within bore 16 where the peripheral, generally spherical surfaces 28 of same engage concave surfaces 18. A shaft 24 secured to and extending outwardly from inner ring 23 of insert 20 may be supported by balls 26. The application of a given swivel torque to the shaft 24 moves the insert 20 a predetermined amount about the bore 16.

Housing 12 is manufactured of cast iron and is cleaned by chemical, thermal or other means to remove oil, grease, or the like that has accumulated thereon during manufacture before the exterior surfaces of same are provided with a protective coating of a fluorocarbon polymer. While cast iron housings are referred to herein in connection with the bearing assemblies, other metallic housings, exemplified by steel and aluminum, could be employed so long as a surface texture can be obtained for bonding of the primer or first polymer coat. The protective coating is resistant to chemical attack, to corrosion, is unaffected by normal operating temperatures and has low friction characteristics.

Before the primer coating is applied to the housing 12 an insert is placed within bore 16 to mask the curved inner surfaces 18. A "dummy" duplicate of the insert 20 is preferred and is inserted into bore 16, after which the entire unit is shot blasted. It has been determined that a surface roughness or texture having a minimum value of roughness average of about 190 Ra. Ra is a universally recognized value of surface roughness, measured in microinches, and is the arithmetic average height of roughness components or irregularities above the mean line. In this case, a Bendix Profilometer manufactured by The Bendix Corporation, Actuation & Measurement Division, Dayton, Ohio, was used. Such finish permits an adequate bonding of the primer coating to the housing to withstand the rigors of the wet harsh environments contemplated. Insertion of the dummy insert into the bore 16 ensures that curved surfaces 18 of bore 16 are unaffected by the shot blasting and therefore remain unaffected. Following treatment of the surface, the dummy insert is removed from the bore 16 before the polymer coating is applied. Since products according to the present invention must undergo the rigors of a wet, harsh environment, including the attendant cleaning processes, it is important, as noted above, that the protective coating be firmly adherent to the product. In fact, without proper adherence of coating, the layer or layers of coating can be peeled away from the product by the high pressure washdown which is typically done at water pressures as high as 200 pounds per square inch. It is thus important that the bottom or primer coating be affixed to the product and that there is adequate bonding between the primer coating and the top coating.

The preferred polymer coating for housing 12 includes a first or primer coating 30 and a top coating 32. Primer polymer coating 30 for the housing 12 is preferably a fluorinated ethylene-propylene polymer, which affords a heavy-duty, non-stick surface for receipt of ring 22 of insert 20. Whereas the prior art assemblies required trial and error matching of bearing inserts and housings, such is not required for the bearing assemblies according to the present invention. Instead, the pliant nature of primer coating 30 permits receipt of virtually all of a given size ring 22 even though normal tolerances may exist. At the same time, there is a generally same swivel torque experienced with all of the assemblies of the present invention. While the above advantages are provided for bearings, as noted above, the present invention is likewise applicable to other industrial products where harsh, wet environs are the norm coupled with rigid cleanup conditions.

Primer coating 30 is not only chemically inert and unaffected by harsh environs, but is also generally receptive of ring 22 of a bearing insert in a much improved fashion than the prior art structures as noted above. The preferred fluorinated ethylene-propylene polymer primer coat is generally produced by copolymerization of tetrafluoroethylene and hexafluoropropylene and predominantly is made up of linear chains of

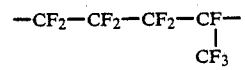

The fluorinated ethylene - propylene polymer may be provided in any suitable form for application to the bearing housing or other industrial structure according to the present invention so long as other conditions as specified herein are met. In a most preferred application, as noted above, a spray coat is applied and the polymer further includes a phenolic binder. Primer coating 30 is thus a modified fluorocarbon which, due to the presence of a thermoset binder such as the phenolics, assumes thermoset characteristics. Hence once the polymer is applied to the structure and heated, it will not return to its former form upon being subjected to further heating, though the fluorocarbon polymer portion of the composite will accept reheating for cross-linking. Such characteristics enable the formation of a mechanical bond between the surface of the structure and the polymer. The exact chemical structure of the overall primer polymer coating is not, however, limited to only the fluorinated ethylene-propylene copolymer nor to use of a phenolic binder, but includes those fluorinated polymers which afford the protective characteristics in the specified environment in conjunction with a binder which affords the bonding characteristics. Suitable commercial polymers include TEFLON 959-200 series resin manufactured by DuPont Company, Wilimington, Delaware and FEP resins of LNP Engineering Plastics, Malvern, Pennsylvania.

Curved surfaces 18 within bore 16 of housing 12, as noted above have historically been nickel plated, and so plated have encountered the restrictions and problems noted above. According to the present invention, the entire housing 12 (including the bore 16) is first provided with the primer polymer coating 30 having a thickness of from about 0.5 mil to about 0.8 mil. The primer coating should be heat resistant to 425° F. (218° C.) on a continuous basis, and up to 450° F. (232° C.) on an intermittent basis, without any appreciable loss of physical properties. The abrasion resistance as tested with a Bell Abrasion Tester should be between 30 to 50 gms/mil. An abrasion resistance sliding arm test with a 500 gm load at 1000 cycles (#400 Emery Paper with 5.5 sq. in. surface) produced a 9.3 mg. weight loss.

After the primer coating 30 is applied to the housing 12, the dummy duplicate of the insert 20 is reinserted into the bore 16. A top coating 32 is then applied to the housing 12, effectively covering the surfaces of the housing except curved inner surfaces 18.

A preferred polymer for the top coating 32 for the surface of housing 12 is a perfluoralkoxy polymer. Perfluoroalkoxy polymers contain repeat units of

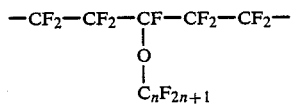

Again, as with the fluorinated ethylene - propylene polymer, various ingredients may be added to the perfluoralkoxy polymer to render same suitable for a particular coating technique. As opposed to primer coating 30, however, top coating 32 should exhibit thermoplastic characteristics in the normal fashion of a fluorocarbon, and when applied to the primer coat 30, based on belief forms crosslinks with fluorocarbon chains of the primer coat. A preferred polymer that is used in spray coating is TEFLON P 532-700 manufactured by DuPont Company. Top coating 32 is preferably applied by a spray coating process to achieve a uniform coating thickness of up to 4.0 mils and preferably between about 1 and about 3 mils; and most preferably from about 2.0 to about 4.0 mils. The top coating should be heat resistant to 500° F. (260° C.) on a continuous basis and up to 550° F. (288° C.) on an intermittent basis. The top coating kinetic coefficient of friction against polished steel is 0.1. The water absorbtion of the top coating is limited to a maximum of 0.03%.

The primer coating 30 should have a combination of low friction characteristics and surface elastic characteristics for use with a bearing as described herein which allows the bearing insert 20 to seat itself in the housing's spherical bore 16 without destroying the corrosion resistant coating. The polymer coating has nonstick surface characteristics that nickel plating does not have which also is very important in the food and chemical industry for washdown and contamination avoidance, and offers greater resistance to corrosive and chemical attack.

The process of applying the primer and top coatings to an industrial product for a power train such as a bearing assembly is set forth below.

A cast iron housing as described above was manufactured and was thermally cleaned by heating the metal to a temperature in a range of from about 800° F. to about 850° F. for one hour to remove oils and greases. A dummy bearing insert was then placed in the housing bore and the housing was grit blasted with an appropriate media, such as aluminum oxide 40 or 60 grit to achieve a minimum surface roughness of about 190 Ra when measured by the Bendix Profilometer. The insert was then removed and the housing was blown off while avoiding contamination by human hands or other greases.

After preheating the cleaned housing to a temperature in a range of about 100° F. to about 125° F., DuPont's TEFLON R 959-200 was spray coated on the entire housing surface, including the bore, to a thickness of about 0.5 mil to about 0.8 mil followed by air drying and cooling to ambient temperature.

The dummy insert was then reinstalled and DuPont's TEFLON R D532-700 was electrostatically sprayed onto all exposed surfaces to a thickness of about 4.0 mils. The dummy insert was then removed and the coated housing was heated in an oven at about 725° F. metal temperature for at least 20 minutes, after which the temperature was reduced. Once the product temperature lowered to 400° F., the product was removed from the heating oven and allowed to air cool to ambient temperature. An actual bearing insert was then inserted into the bearing bore.

In certain instances, it was determined that top coat thickness was less than desired. In such cases, the electrostatic spray application and heating at a metal temperature of 725° F. for at least 20 minutes was repeated.

Following the above process, the coated part is visually inspected for various defects. Further, in order to test adhesion of the coating, the coated parts are boiled in water for 15 minutes followed by cooling to room temperature. A cross is then scratched down to the substrate on the coating followed by manual attempts to grasp the coating and peel it back from the substrate. If no peel back occurs, the coating has adequate adhesion to withstand high pressure water washdowns.

While particular preferred polymers have been described, it should be noted that any form of fluorocarbon polymer which may be suitably applied to cast iron and which has non-sticking, chemically resistant characteristics, can be employed to coat the exterior and interior surfaces of the bearing housing for the purposes of this invention.

Furthermore, it should be noted that the form of the housing disclosed herein is given only by example, and is not deemed to be limiting on the invention. Obviously, any type of bearing housing that is going to be exposed to the corrosive effect of food and chemical attack, will benefit from the polymer coating considered herein. It is obvious that many changes may be made herein without deviating from the scope of the claims appended hereto.

What is claimed is:

1. An industrial product for use in a power train in a wet or harsh environment comprising:
   (a) a rigid metal housing, said housing having a surface texture of at least 190Ra, said housing having a coating of a first fluorocarbon polymer over all surfaces to be protected from said environment, said first fluorocarbon polymer having a low porosity, exhibiting low friction characteristics and being resistant to corrosion and chemical attack, and containing a binder which affords a thermoset characteristic thereto and being present on said surfaces to be protected in a thickness of from about 0.5 mil to about 0.8 mil, said housing further having a second fluorocarbon polymer on at least the exterior surfaces of same for which protection is desired, said second fluorocarbon polymer having a low porosity, exhibiting low friction characteristics and being resistant to corrosion and chemical attack, exhibiting thermoplastic characteristics and being present on said exterior surfaces in a thickness of up to 4.0 mils, said second fluorocarbon coating being bonded to said first fluorocarbon coating.

2. A product as defined in claim 1 wherein said product is a bearing housing and all exterior surfaces are coated with said fluorocarbon polymers.

3. A product as defined in claim 1 wherein said first fluorocarbon polymer is a fluorinated ethylene-propylene copolymer and includes a phenolic binder.

4. A product as defined in claim 3 wherein the second fluorocarbon polymer is a perfluoroalkoxy polymer.

5. A bearing assembly suitable for use in a wet or harsh chemical environment comprising:
   (a) a metal bearing housing having a spherical bore for support of a bearing insert of a predetermined diameter, outer surfaces of said bearing housing having a surface texture of a minimum of 190 Ra;
   (b) a spherical insert having an outer surface which is received within said bore and is slightly undersized with respect to said bore, said spherical bearing insert defining an inner bore for supporting a shaft;
   (c) a first fluorocarbon polymer coating on said outer surfaces of said housing and said surfaces of said spherical bore which receives said insert, said first fluorocarbon polymer having a low porosity, exhibiting low friction characteristics and being resistant to corrosion and chemical attack, having a binder therein for bonding to said surfaces of said housing and being present thereover in a thickness of from about 0.5 mil to about 0.8 mil; and
   (d) a second fluorocarbon polymer atop said first fluorocarbon polymer over said exterior surfaces of said housing and being bonded with said first fluorocarbon polymer, said second fluorocarbon polymer being present in a thickness of up to about 4.0 mils, both of said fluorocarbon polymers having low porosity, exhibiting low friction characteristics and being resistant to corrosion and chemical attack.

6. A bearing assembly as defined in claim 5 wherein ball bearings are disposed within an inner bore of said bearing insert for supporting the shaft.

7. A bearing assembly as set forth in claim 5, wherein roller bearings are disposed within the inner bore of said bearing insert for supporting a shaft.

8. A bearing assembly as set forth in claim 5, wherein bushings are disposed within the inner bore of said bearing insert for supporting a shaft.

* * * * *